(12) United States Patent
Thuillier et al.

(10) Patent No.: US 9,714,186 B2
(45) Date of Patent: Jul. 25, 2017

(54) BENDING OF SHEETS OF GLASS RUNNING ON A BED OF ROLLS

(71) Applicant: SAINT-GOBAIN GLASS FRANCE, Courbevoie (FR)

(72) Inventors: Sébastien Thuillier, Compiegne (FR); Fouad Fahl, Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/433,128

(22) PCT Filed: Oct. 2, 2013

(86) PCT No.: PCT/FR2013/052348
§ 371 (c)(1),
(2) Date: Apr. 2, 2015

(87) PCT Pub. No.: WO2014/053776
PCT Pub. Date: Apr. 10, 2014

(65) Prior Publication Data
US 2015/0259234 A1    Sep. 17, 2015

(30) Foreign Application Priority Data

Oct. 3, 2012    (FR) ...................................... 12 59368

(51) Int. Cl.
*C03B 23/033*    (2006.01)
*C03B 35/18*    (2006.01)
(Continued)

(52) U.S. Cl.
CPC ............ *C03B 23/033* (2013.01); *B65G 39/02* (2013.01); *C03B 27/0431* (2013.01);
(Continued)

(58) Field of Classification Search
CPC .... B65G 39/125; B65G 39/025; B65G 39/04; B65G 49/067; B65G 49/063;
(Continued)

(56) References Cited

U.S. PATENT DOCUMENTS 3,169,847 A * 2/1965 Condon ................ C03B 23/095
65/109
3,198,317 A * 8/1965 Davis ..................... B65G 39/04
198/501

(Continued)

FOREIGN PATENT DOCUMENTS

DE    33 10 357 A1    9/1984
EP    0 522 963 A1    1/1993

(Continued)

OTHER PUBLICATIONS

Machine translation of EP0123119 as provided by http://worldwide.espacenet.com/publicationDetails/description;jsessionid=j9ossm5NXIxs4mtPbldOERY4.espacenet_levelx_prod_2?CC=EP&NR=0123119A2&KC=A2&FT=D&ND=&date=19841031&DB=&locale=en_EP on Feb. 14, 2016.*

(Continued)

*Primary Examiner* — Jodi C Franklin
(74) *Attorney, Agent, or Firm* — Pillsbury Winthrop Shaw Pittman LLP

(57) ABSTRACT

A device for bending sheets of glass running between a bed of upper rolls and a bed of lower rolls forming a shaping bed that pinches the sheets as they run, the shaping bed being disposed in a path having a curved profile in the running direction of the sheets of glass, the shaping bed including at least one roll of what is known as the rod/sheath type including a fixed metal rod preformed in a curved profile lengthwise and a flexible sheath that is able to rotate about the rod, the sheath being rotated about the rod. The roll of the rod/sheath type may include a metal rod preformed in a (Continued)

Figure 1:
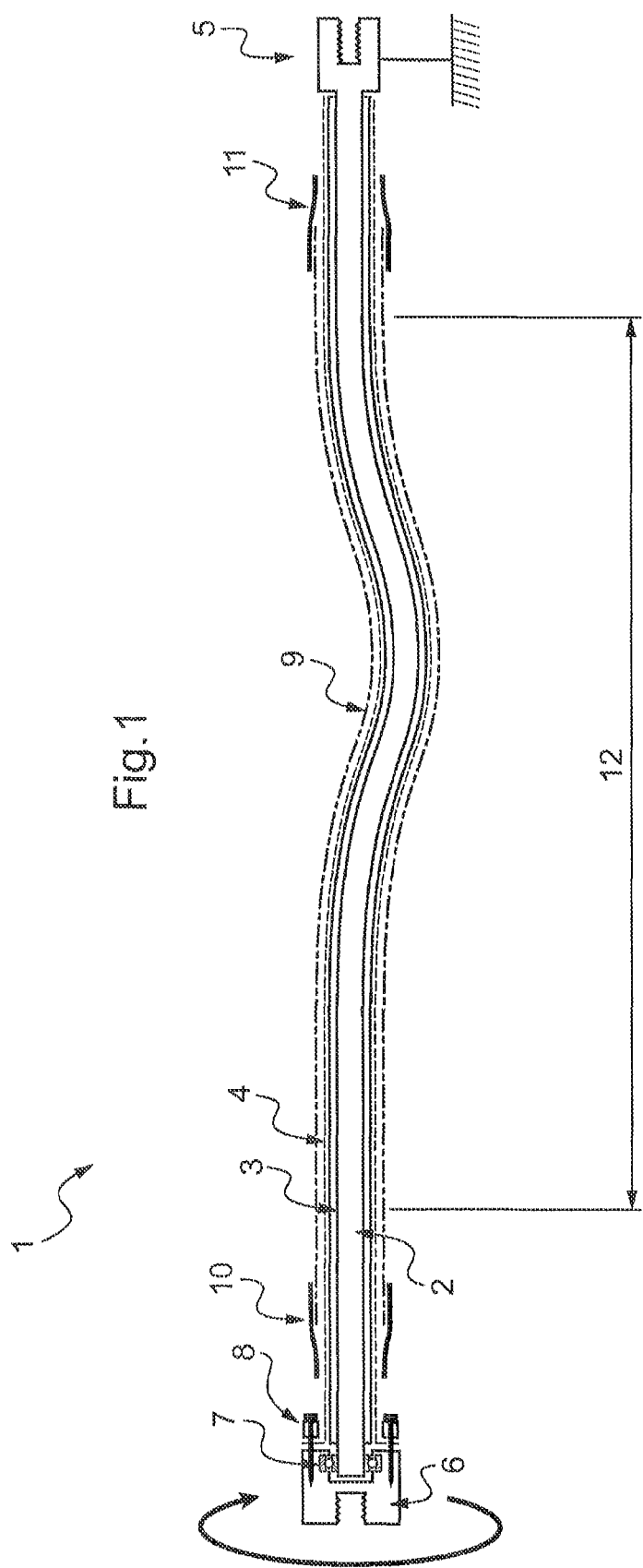

curved profile lengthwise and a flexible sheath that is able to rotate about the rod, the sheath including a first envelope made of a polymer material and a second envelope made of a flexible metal material disposed around the first envelope, the first and the second envelope rotating together as one.

12 Claims, 3 Drawing Sheets

(51) Int. Cl.
| | |
|---|---|
| *C03B 40/00* | (2006.01) |
| *C03B 27/04* | (2006.01) |
| *B65G 39/02* | (2006.01) |
| *C03B 40/02* | (2006.01) |
| *C03B 35/16* | (2006.01) |

(52) U.S. Cl.
CPC .......... *C03B 35/181* (2013.01); *C03B 35/182* (2013.01); *C03B 40/005* (2013.01); *C03B 40/02* (2013.01); *C03B 35/163* (2013.01); *C03B 35/186* (2013.01)

(58) Field of Classification Search
CPC . B65G 49/064; C03B 23/0254; C03B 23/033; C03B 35/16; C03B 35/181; C03B 35/182; C03B 35/183
USPC .................. 65/24, 26, 169, 253–257, 370.1
See application file for complete search history.

(56) References Cited

U.S. PATENT DOCUMENTS

| | | | | |
|---|---|---|---|---|
| 3,797,082 | A * | 3/1974 | Brunes ................... | B65G 39/04 198/780 |
| 3,853,525 | A * | 12/1974 | Gorman ................ | C03B 35/189 492/53 |
| 4,015,968 | A | 4/1977 | Revells et al. | |
| 4,028,086 | A | 6/1977 | Rahrig et al. | |
| 4,139,359 | A | 2/1979 | Johnson et al. | |
| 4,167,997 | A | 9/1979 | Revells | |
| 4,216,005 | A * | 8/1980 | Gladieux ............... | C03B 35/181 427/443.2 |
| 4,226,608 | A * | 10/1980 | McKelvey ........... | B65G 39/125 65/104 |
| 4,246,313 | A * | 1/1981 | Stengle, Jr. ............. | B29C 70/22 156/280 |
| 4,311,509 | A * | 1/1982 | Reader ................... | B65G 39/04 492/40 |
| 4,352,230 | A * | 10/1982 | Sukenik ................ | B21B 39/008 432/246 |
| 4,363,163 | A * | 12/1982 | McMaster ............. | C03B 35/181 226/190 |
| 4,397,673 | A * | 8/1983 | Stevens ................. | C03B 35/181 65/194 |
| 4,421,482 | A * | 12/1983 | McMaster ............. | B65G 39/02 432/121 |
| 4,525,196 | A * | 6/1985 | Fecik ...................... | C03B 35/18 432/236 |
| 4,540,425 | A | 9/1985 | Bocelli et al. | |
| 4,540,426 | A | 9/1985 | Bocelli et al. | |
| 4,776,071 | A * | 10/1988 | Yoshizawa ......... | B29D 99/0035 226/190 |
| 5,069,705 | A | 12/1991 | Letemps et al. | |
| 5,094,679 | A | 3/1992 | Letemps et al. | |
| 5,565,013 | A * | 10/1996 | Tinelli ................... | C03B 35/18 65/118 |
| 5,655,642 | A * | 8/1997 | Lawrence ............. | B65G 39/04 193/37 |
| 6,598,427 | B1 | 7/2003 | Douche et al. | |
| 7,665,331 | B2 * | 2/2010 | Leclercq ............... | B65G 49/067 65/104 |
| 2007/0084245 | A1* | 4/2007 | Leclercq ............... | B65G 49/067 65/106 |
| 2011/0247918 | A1* | 10/2011 | Hsu ....................... | B65G 13/02 198/623 |
| 2012/0261536 | A1* | 10/2012 | McArthur ............. | F16C 27/066 248/309.1 |
| 2013/0341160 | A1* | 12/2013 | Chen ...................... | B65G 43/10 198/783 |

FOREIGN PATENT DOCUMENTS

| | | |
|---|---|---|
| EP | 1 357 090 A2 | 10/2003 |
| FR | 2 862 056 A1 | 5/2005 |
| JP | S52-78913 A | 7/1977 |
| JP | S52-110719 A | 9/1977 |
| JP | 2003-321231 A | 11/2003 |
| JP | 2004-277828 A | 10/2004 |
| JP | 2004-323208 A | 11/2004 |
| JP | 2008-100914 A | 5/2008 |
| WO | WO 03/106356 A2 | 12/2003 |
| WO | WO 2005/047198 A1 | 5/2005 |
| WO | WO 2007/064520 A1 | 6/2007 |

OTHER PUBLICATIONS

International Search Report as issued in International Patent Application No. PCT/FR2013/052348, dated Dec. 2, 2013.
Notice of Reasons for Rejection as issued in Japanese Patent Application No. 2015-535091, dated May 16, 2017.

* cited by examiner

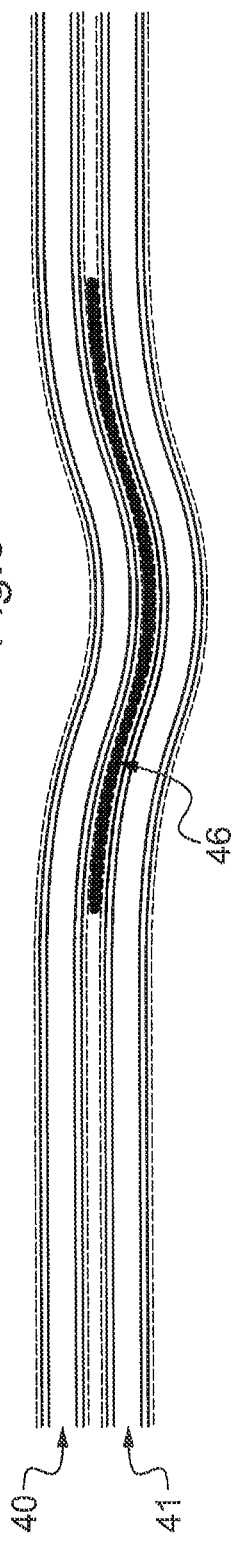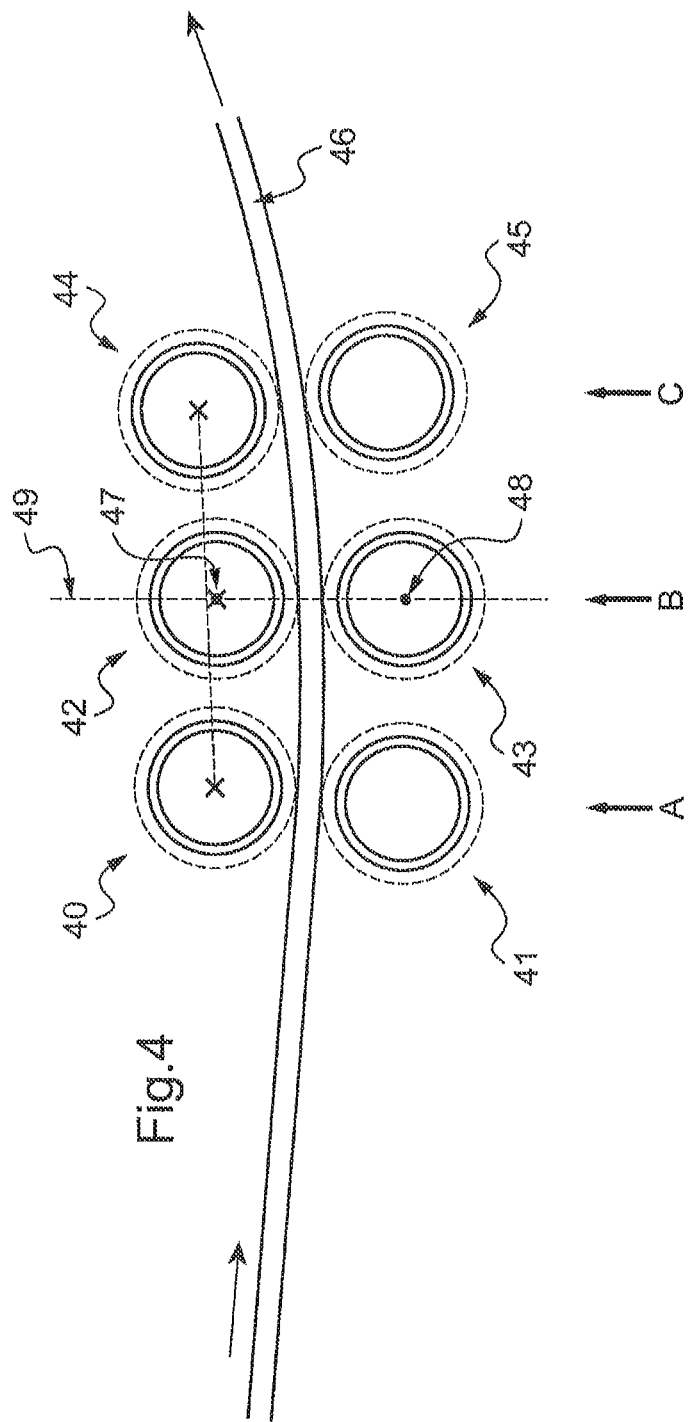

BENDING OF SHEETS OF GLASS RUNNING ON A BED OF ROLLS

CROSS-REFERENCE TO RELATED APPLICATIONS

This application is the U.S. National Stage of PCT/FR2013/052348, filed Oct. 2, 2013, which in turn claims priority to French Application No. 1259368, filed Oct. 3, 2012. The contents of all of these applications are incorporated herein by reference in their entirety.

The invention relates to the bending of sheets of glass running on a bed of rolls.

More particularly, the invention relates to a technique in which the sheets of glass are made to run on at least one shaping bed comprising shaping rolls disposed along a path having a curved profile in the running direction of the sheets of glass.

The invention applies for example to the production of motor vehicle glazing, for example of the motor vehicle side window type.

Such bending techniques are usually employed at very high production rates on account in particular of the possibility of moving the sheets of glass along with a spacing of only a few centimeters between them. They allow good reproducibility of the curvature and the optical quality of the final glazing.

Bending methods and machines of this type are described for example in U.S. Pat. No. 4,540,425, U.S. Pat. No. 4,540,426, U.S. Pat. No. 6,598,427 and U.S. Pat. No. 7,665,331. In a known manner, the sheets of glass are brought to their softening temperature in a furnace; they then leave the furnace in order to run in an ascending or descending manner through a shaping bed which has a curved profile, for example in the form of a portion of a circle, which they enter horizontally in a tangential manner and which gives the desired curvature to the sheets of glass. This type of bending gives the sheets a curvature in their running direction.

Once the sheets have been shaped, they are tempered or cooled in order to be hardened, and then, generally, a tilting device makes it possible to replace them horizontally at the outlet from the shaping bed on a conveyor that carries them toward a second cooling zone and then toward the outlet zone.

The simplest known method of this type uses rectilinear and perfectly cylindrical rolls that are aligned along a portion of a circle rising in the running direction of the sheets. This method provides a cylindrical curvature in the running direction but no curvature in the direction transverse to the running direction. In order to bend sheets of glass simultaneously in two directions at right angles to one another (in the running direction and at right angles to the running direction), different types of rolls have been proposed. U.S. Pat. No. 4,139,359 teaches rolls and counter-rolls in the form of a diabolo/barrel. The drawback of this type of roll is that the tangential speeds at the surface thereof vary greatly depending on the transverse position (that is to say over the length of the roll) as a result of the variation in diameter of the roll. The surface of the glass is thus inevitably subjected to friction, which is liable to mark it. U.S. Pat. No. 5,069,705 and U.S. Pat. No. 5,094,679 teach shaping beds that use rolls that are cylindrical but bent in a forced manner in the elastic region when the roll is mounted in the bending device. The forced bending produces a transverse curvature in the running direction, but it is not possible to modify its shape, which is close to that of a circle, and of which it is only possible to modify the radius. DE3310357A1 teaches a roll comprising a core covered with a rotating sheath comprising a metal envelope having corrugations. These corrugations give good dimensional stability to the diameter of the envelope but do not afford a smooth surface and are thus liable to cause marking of the glass, even if an external sock covers them. US2007084245 (or WO2005047198) teaches a bed for shaping sheets of glass, said bed comprising rolls that allow said sheets to advance and are disposed along a path having a profile in the form of a circular arc, the sheets progressively assuming their shape on entering the bed in a first zone known as the shaping zone, and then being hardened by tempering or cooling in a second zone of the bed as far as their outlet, bent sheets of glass thus being obtained.

In order to produce a curvature transversely with respect to the running direction, rolls which have a constant section along their length (thus transversely to the running direction) but which can have any shape along this length have now been produced. The roll comprises a fixed metal rod which is preformed (that is to say has been given its definitive shape corresponding to the desired bending shape prior to being mounted on the bending device) and a flexible sheath surrounding said rod and able to rotate about the rod. The sheath is rotated about the fixed rod and in this way carries the sheets of glass along. The roll can thus have almost any shape and not necessarily the shape of a circular arc. The roll is given its shape prior to being mounted on the bending device by way of the shape given to the pre-bent rod, and there is no need to deform it by forced bending during said mounting.

The invention relates to a device for bending sheets of glass running between a bed of upper rolls and a bed of lower rolls forming a shaping bed that pinches the sheets as they run, said shaping bed being disposed in a path having a curved profile in the running direction of the sheets of glass, said shaping bed comprising at least one roll (of what is known as the rod/sheath type) comprising a fixed metal rod preformed in a curved profile lengthwise and a flexible sheath that is able to rotate about said rod, said sheath being rotated about said rod.

For simplification, this type of roll may be called a "rod/sheath roll" in the present application. Generally, two rolls of the rod/sheath type (known as a "pair of rolls") together pinch the sheet of glass passing between them by way of a combined action. Generally, the sheath of a rod/sheath roll is rotated by one of the sides of the roll and the rod is kept fixed by the other side of the roll.

The shaping bed of the device according to the invention simultaneously gives the running sheets two curvatures at right angles to one another (in the running direction and at right angles to the running direction). The distance between a roll of the upper bed and a roll of the lower bed (these two rolls forming a pair of rolls) corresponds to the thickness of the sheet of glass. The passage of the sheet between the pair of rolls modifies the curvature of the sheet in these two directions at right angles to one another. In order to modify the curvature of the sheets of glass in the running direction, it is appropriate to position at least three pairs of rolls, the offset of which exerts a deformation on the sheet passing between them, in a juxtaposed manner. Of course, the bending device according to the invention may also comprise pairs of rolls of the rod/sheath type that do not modify the curvatures of the sheet, since when the latter is fixed in its shape by cooling, there is no longer any need to continue bending it and it is only appropriate to continue conveying it. These rolls which are essentially conveyors and not shapers are located after the shaping zone, in the cooling, in particular tempering, zone.

The device according to the invention comprises a bed for shaping sheets of glass, comprising at least one roll of the rod/sheath type. The shaping bed comprises an upper bed and a lower bed. A number of rolls of the rod/sheath type may equip the two beds of rolls (upper bed and lower bed), between which the sheets of glass run. The sheets are pinched between the two beds of rolls, with the distance between the contact surfaces of said rolls corresponding to the thickness of the sheet of glass. The beds may have a curved profile that ascends or descends in the running direction so as to give the sheets a curvature in the running direction. The curvatures transversely to the running direction are given to the sheets by virtue of the fixed bend previously given to the rod of the rod/sheath roll. The curvatures in the running direction or transversely with respect to the running direction may vary in the course of running. It is thus possible to progressively increase the curvatures in one direction or the other by modifying the variation in the radius of curvature of the shaping bed in the course of running or by intensifying the curvatures of the rolls between the start and end of the shaping zone. The shaping bed may comprise pairs of rolls, each pair comprising an upper roll (above the sheets) and a lower roll (below the sheets), which are positioned sufficiently close together (being able in particular to be opposite one another) and on each side of the sheets in order to pinch the latter as they run. Thus, the two rolls of one and the same pair may in particular be aligned on either side of the sheet running between them.

In order for the bending to be precise, it is preferable to reduce the diameter of the rolls. These preferably have a diameter of between 25 and 70 mm, in particular between 25 and 55 mm. In the forming zone, the rolls of the upper bed on one side and the rolls of the lower bed on the other side are preferably very close to one another, such that there may be a distance between two rolls (free space between two adjacent rolls of the upper bed or lower bed) of preferably between 20 and 140 mm. In the cooling zone, it may be necessary to place nozzles blowing cold air (which includes room temperature) between the rolls. In this case, the distance between rolls may range preferably from 30 to 150 mm.

Lengthwise, a rod/sheath roll describes a profile, the curvature of which may change sign several times. Such a roll may have different radii of curvature along its length.

The curved profiles of the lower and upper rolls of a pair of rolls placed opposite one another on either side of the running sheets may be different, especially if it is necessary to ensure a constant distance between them which is equal to the sheet of glass.

In the forming zone, a succession of three pairs of juxtaposed rolls, preferably all of the rod/sheath type, may be disposed so as to be able to effectively bend the running sheets. For this purpose, it is appropriate for the axes of the three rolls located on one and the same side of the running sheets not to be aligned if they are viewed on a longitudinal section plane (transverse view) parallel to the running direction and to impose a greater curvature on the sheets than the one they already have (this including the possibility that they are planar when they arrive at the three rolls). It is this non-alignment which makes it possible to modify the shape of the running sheet. This non-alignment exists both for the three lower rolls of the pairs of juxtaposed rolls and for the three upper rolls of the pairs of juxtaposed rolls. Thus, the device according to the invention may comprise three juxtaposed pairs of rolls, the axes of the three upper rolls of the three pairs not being aligned, and the axes of the three lower rolls of the three pairs not being aligned, such that the sheets are deformed as they pass between the three pairs of rolls.

The rod/sheath roll may thus equip zones of the bending/tempering device that do not modify the shape of the sheet of glass as long as said roll is in a zone where its function is limited to carrying the sheet of glass along, for example in the cooling zone.

The invention also relates to a particular rod/sheath roll specifically designed to be used in the device according to the invention. The roll according to the invention serves to carry along and if appropriate to bend sheets of glass. It comprises a metal rod preformed in a curved profile lengthwise and a flexible sheath that is able to rotate about the rod, said sheath comprising a first envelope made of a polymer material and a second envelope made of a flexible metal material disposed around the envelope made of polymer material. The rod may be made of steel, in particular steel 304 or 316 or any steel which is resistant to the temperatures to which it is subjected. The rod is preformed such that it retains its shape even when it is not subjected to any stress, in particular in the state when it is not mounted on the bending device. The roll thus has the same shape whether or not it is mounted on the bending device. Even if the roll is not placed in a furnace, it is intended to convey sheets of glass that have been brought to their bending temperature, that is to say between 600 and 700° C. The sheath is advantageously an assembly of a first, inner tubular envelope made of a polymer material and a second, (woven or braided) flexible metal tubular envelope, the second envelope surrounding the first. The second envelope is in contact with the first envelope. The second envelope is secured to the first by adhesive bonding or simply by clamping it sufficiently to the first envelope. The inside diameter of the second envelope is approximately equal to the outside diameter of the first envelope. The second envelope is thus generally mounted without play around the first envelope. In general, the second envelope is not entirely integral with the first envelope, such that it is possible theoretically to rotate it about the first envelope by applying a sufficient force, this bringing about significant friction between the two envelopes. This possibility of rotation of the second envelope with respect to the first envelope is not desired in the scope of the present invention. Specifically, it is appropriate for the first and the second envelope to be sufficiently integral (and thus cohesive) for them to rotate together in the present application, the interface between the two envelopes then being a non-sliding interface. This means in particular that the entire sheath is rotated even if only one of the two envelopes is made to rotate about the rod, in particular at one of its ends and without a particular action being exerted on the other envelope. This type of sheath is for example used as a hose for equipping sanitary installations and is placed between the water inlet pipe and the plumbing fittings. In the application according to the invention, that is to say as a roll for conveying and/or bending sheets of glass, the two envelopes behave as one and rotate together and as one about the preformed fixed rod. They are integral on account of their cohesion, which makes them a single unit. The two envelopes can be rotated about the rod by the envelopes being driven on one of their sides (or even on both sides). If the two envelopes are sufficiently integral, they can be rotated together about the rod by driving only one of them, in particular the second (metal) envelope, for example by holding it pinched between two metal parts, only on one side of the roll. In this case, the first and the second envelope can be said to rotate as one. The metal rod may comprise an inner duct along its length, making it possible to pass a cooling fluid (air or water). Since this preformed rod is fixed in use, it is particularly easy to feed and eject the cooling fluid into and from the rod.

The second envelope made of metal fibers has, on account of its woven or braided structure, a sufficiently smooth surface to avoid marking the glass. This structure of the metal sheath requires good cohesion with the first envelope, since it is this cohesion, on account in particular of the absence of play between them, which prevents the deformation of the second envelope. Specifically, if an attempt is made to rotate a woven or braided metal sheath without a first envelope provided cohesively beneath it, it will be observed that this metal sheath forms folds and twists, such that it is completely inadequate to provide a uniform and smooth surface for the sheets of glass. Similarly, if an attempt is made to rotate a sheath made of polymer without a second, metal envelope provided cohesively above it, it will also be observed that this envelope twists and forms folds. It is thus clearly the cohesive connection between these two materials having very different elasticities which results in a sheath that meets the necessary specifications very well. It appears that the metal fibers prevent twisting of the first envelope about the metal rod and that the envelope made of polymer prevents the compression of the metal envelope along the preformed metal rod. This sheath that connects the two envelopes in a cohesive manner is sufficiently deformable to follow the profile of the preformed metal rod, but is sufficiently rigid not to deform too greatly by twisting and to risk forming folds.

Of course, it is appropriate to use a polymer material that is resistant to the temperatures to which it is subjected. In particular, the polymer material used may be a polytetrafluoroethylene (PTFE), in particular available under the trade name Teflon. Specifically, this material is advantageous since it has a low coefficient of friction, this being favorable to the rotation of the sheath about the preformed rod, and it is stable at least up to 400° C. The polymer material used may also be a polyethylene, which also has a low coefficient of friction. However, it is more difficult to employ since it is more sensitive to temperature. The possibility of using a polymer material as the element of a roll that is intended to convey and deform sheets of glass that are brought to over 500° C. involves an innovative step. This first envelope may also comprise two sub-envelopes made of different materials, in particular a first sub-envelope made of PTFE, on which a second sub-envelope made of polyethylene is located.

The second envelope is metallic and may be made of refractory fibers such as stainless steel fibers. It was found that this metal envelope effectively protected the envelope made of polymer which it covers from heat, without doubt by rapidly evacuating the heat tangentially to the roll and into the ambient air and in this way avoiding hot spots on the surface of the envelope made of polymer. In addition, the braided envelope made of metal serves as a structure for holding the sheath and allows the envelope made of polymer to resist regular compression/extension movements to which it is subjected on account of the rotation about the preformed rod and the pinching action on the sheet of glass. In this way, the metal envelope allows bends at small radii of curvature that can be as low as 100 mm (radii of curvature of at least 100 mm) by virtue of the hold exerted by the metal envelope on the polymer envelope. The metal envelope thus prevents direct contact of the polymer material with the running hot sheets and reduces the tendency of said polymer material to decompose. The sheath is wrapped around the bent rod with as little play as possible, but with sufficient play to allow it to rotate about the rod. This play is generally between 0.4 and 5 mm. Preferably, a lubricant is placed between the rod and the sheath (that is to say between the rod and the first envelope made of polymer material) in order to facilitate the rotational movement of the sheath about the rod. The lubricant used may in particular be a lubricant comprising a material having a low coefficient of friction, such as graphite, molybdenum disulfide ($MoS_2$) or hexagonal boron nitride (BN). Preferably, the sheath is surrounded by a sock made of refractory fibers such as silica fiber, aramid fibers (in particular made of Kevlar such as the material sold under the trade name Tuffnit) or fibers of stainless steel, so as to soften the contact with the glass and reduce the risks of marking the glass. The sock is a material made of braided or knitted or woven fibers. The sock rotates as one with the sheath and is fixed thereto for example by adhesive strips placed close to the ends of the roll. The sheets of glass circulate and are shaped by the rolls according to the invention in contact only with the sock. By way of example, the rod may have a diameter of 10 to 40 mm, the first envelope made of a polymer material may have a thickness of 1 to 10 mm and the second envelope made of a flexible metal material may have a thickness of 0.5 to 10 mm, generally 0.5 to 2 mm.

FIG. 1 shows a roll according to the invention. It comprises a fixed rigid metal rod 2. Wrapped around the rod is a flexible sheath comprising a first envelope 3 made of a polymer material and a second envelope 4 made of a metal braid (shown by way of close dotted lines). The inside diameter of the sheath made of polymer has a diameter 2 mm greater than the outside diameter of the rod. The first and the second envelope are integral on account of the absence of play between them. The fixity of the rod is given to it by its right-hand side, said fixity being shown by the symbol of the earth. The rod comprises on its right-hand side (in the figure) a mandrel 5 provided with securing elements that prevent the rod from rotating. The rotation of the sheath (represented by an arrow) is ensured by the left-hand side (in the figure) by way of the mandrel 6 that can rotate about the rod 2 by way of a ball bearing 7. This mandrel 6 is provided with a clamp 8 that makes it possible to clamp several centimeters of metal envelope 4 which have been detached from the envelope 3 made of polymer material. By causing the mandrel 6 to rotate, the entire sheath is driven by way of the metal envelope 4 on account of the sufficient solidarity between the two envelopes that form the sheath. Advantageously, the rod 2 is lubricated before the sheath is wrapped around it. A "sock" 9 surrounds the sheath in order to soften the contact with the sheets of glass. This sock 9 is secured to the metal envelope by virtue of adhesive strips 10 and 11. The sock 9 is rotated by the metal envelope 4. The sheets of glass are intended to circulate between the two adhesives 10 and 11 and thus more or less in the zone 12, perpendicularly to the figure.

Figure 2:
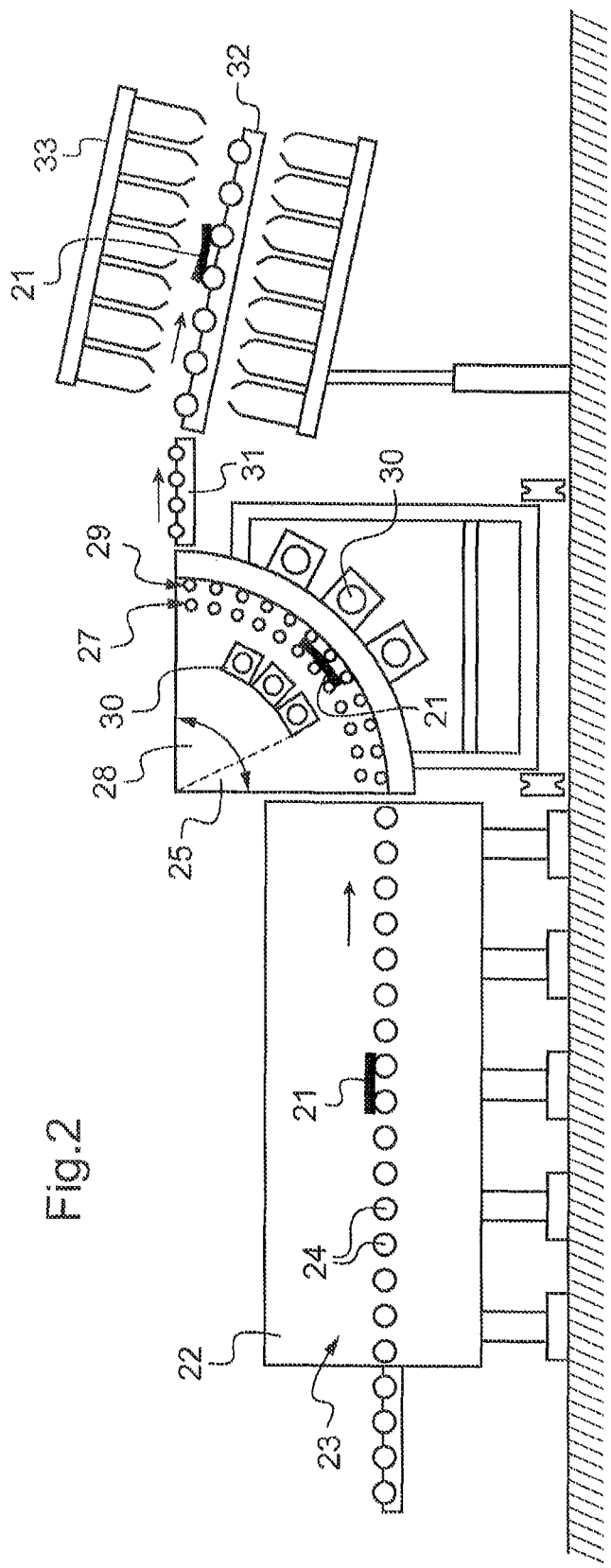

FIG. 2 shows a schematic side view of a bending/tempering machine to which the invention refers, in which a sheet of glass runs through a heating furnace, then through an ascending shaping bed, then, at the outlet, through a secondary cooling zone. The sheet of glass 21 firstly passes through a heating zone 22 (tunnel furnace), through which it is conveyed on a horizontal conveyer 23 moved by a set of rectilinear drive rolls 24 that are aligned in a plane. At the outlet from the heating zone 22 and thus of the temperature-raising furnace, the temperature of the sheet of glass 21 is at a temperature that allows it to be bent. The sheet of glass 21 then passes into the shaping zone 25 comprising a shaping bed in which a bed of upper rolls 29 and a bed of lower rolls 27 are mounted longitudinally following a profile in the form of a circular arc. The sheets of glass run and are pinched between these two beds of rolls. The rolls 27 and 29 thus form an ascending shaping bed which conveys the sheet of glass 21 in the same direction as the conveyer 23. In the shaping zone 25, the sheets of glass 21 are given a curvature imposed by the rolls according to the invention. The shaping zone 25 is followed by a tempering or cooling zone 28 through which the sheets of glass 21 are conveyed in order to harden. The tempering or cooling members are formed by blowing plenums 30 disposed on either side of the rolls 27 and 29 and thus acting on the two faces of the sheet of glass 21 such that by passing between the plenums 30, and depending on the blowing pressure chosen, the bent sheet of glass 21 is either tempered or simply hardened in the bent position. On leaving the shaping bed, the bent sheet of glass 2 is pinched by the two last pairs of rolls 27 and 29 and tilts on to a conveyor 31, which transports the sheets of glass in the same direction as the conveyer 23 in the heating zone 22. The sheet of glass 21 is then evacuated by a flat conveyor 32 which passes through a secondary cooling zone 33.

FIG. 3 shows a pair of rolls 40 and 41 according to the invention, pinching a sheet of glass 46 passing between them. This is a view in the direction of the running direction, making it possible to appreciate the transverse curvature of the sheet of glass.

FIG. 4 shows three pairs of rolls A (rolls 40 and 41), B (rolls 42 and 43), C (rolls 44 and 45) according to the invention, pinching a sheet of glass 46 passing between them. This is a view at right angles to the direction of the running direction (shown by arrows) making it possible to appreciate the longitudinal curvature of the sheet of glass in its running direction. The same sheet as the one shown in FIG. 3 may be being bent. It can be seen that the plane 49 passing through the axes 47 and 48 of the rolls 42 and 43 is at right angles to the sheet of glass, which means that the two rolls 42 and 43 are properly aligned opposite one another, on each side of the sheet of glass. The same goes for the pairs of rolls A on one side and C on the other side. In a view in the transverse direction that makes it possible to appreciate a longitudinal section plane, as is the case in FIG. 4, the axes of the three upper rolls 40, 42 and 44 on one side and the axes of the three lower rolls 41, 43, 45 on the other side are not aligned. It is this non-alignment which imposes a longitudinal curvature in the running direction on the sheet 46 passing between them.

The invention claimed is:

1. A device for bending sheets of glass running between a bed of upper rolls and a bed of lower rolls forming a shaping bed that pinches the sheets of glass as the sheets of glass run, said device comprising said shaping bed that is disposed in a path having a curved profile in a running direction of the sheets of glass, a rotating assembly and a clamp, wherein said shaping bed comprises at least one roll, said roll comprising a metal rod preformed in a curved profile lengthwise and a flexible sheath that is able to rotate about the rod, said sheath comprising a first envelope made of a polymer material and a second envelope made of a flexible metal material disposed around the first envelope so that the sheath is sufficiently deformable to follow the curved profile of the preformed metal rod, the first and the second envelope arranged to rotate together as one, wherein said clamp is arranged to clamp the flexible sheath to the rotating assembly only by way of the second envelope so that rotation of the flexible sheath by the rotation assembly is carried out only by way of the second envelope and rotation of the second envelope by the rotating assembly rotates the first envelope.

2. The device as claimed in claim 1, wherein the flexible metal material is made of woven or braided fibers.

3. The device as claimed in claim 1, wherein the polymer material is made of PTFE or polyethylene.

4. The device as claimed in claim 1, wherein the second envelope is covered by a sock of fibers.

5. The device as claimed in claim 1, comprising a lubricant between the preformed metal rod and the first envelope.

6. The device as claimed in claim 1, wherein the flexible sheath is rotated by one side of the roll and the metal rod is kept fixed by another side of the roll.

7. The device as claimed in claim 1, wherein the shaping bed comprises at least one pair of said rolls placed on either side of the running sheets of glass in order to pinch them together.

8. The device as claimed in claim 1, comprising three juxtaposed pairs of said rolls, the axes of the three upper rolls of the three juxtaposed pairs not being aligned, and the axes of the three lower rolls of the three juxtaposed pairs not being aligned, such that the sheets of glass are deformed as the sheets of glass pass between the three juxtaposed pairs of rolls.

9. A method for bending sheets of glass by the device of claim 1.

10. The device as claimed in claim 1, wherein said second envelope is detached from the first envelope along a portion thereof and wherein said clamp is configured to clamp said portion to the rotating assembly.

11. The device as claimed in claim 1, further comprising a first mandrel provided at a first end of the rod, wherein the mandrel is provided with securing elements that prevent the rod from rotating.

12. The device as claimed in claim 11, wherein the rotating assembly comprises a second mandrel that is rotatable about the rod by way of a ball bearing.

* * * * *